April 3, 1951     D. A. GROSS     2,547,316
SWIVEL JOINT
Filed Dec. 16, 1946     2 Sheets-Sheet 1
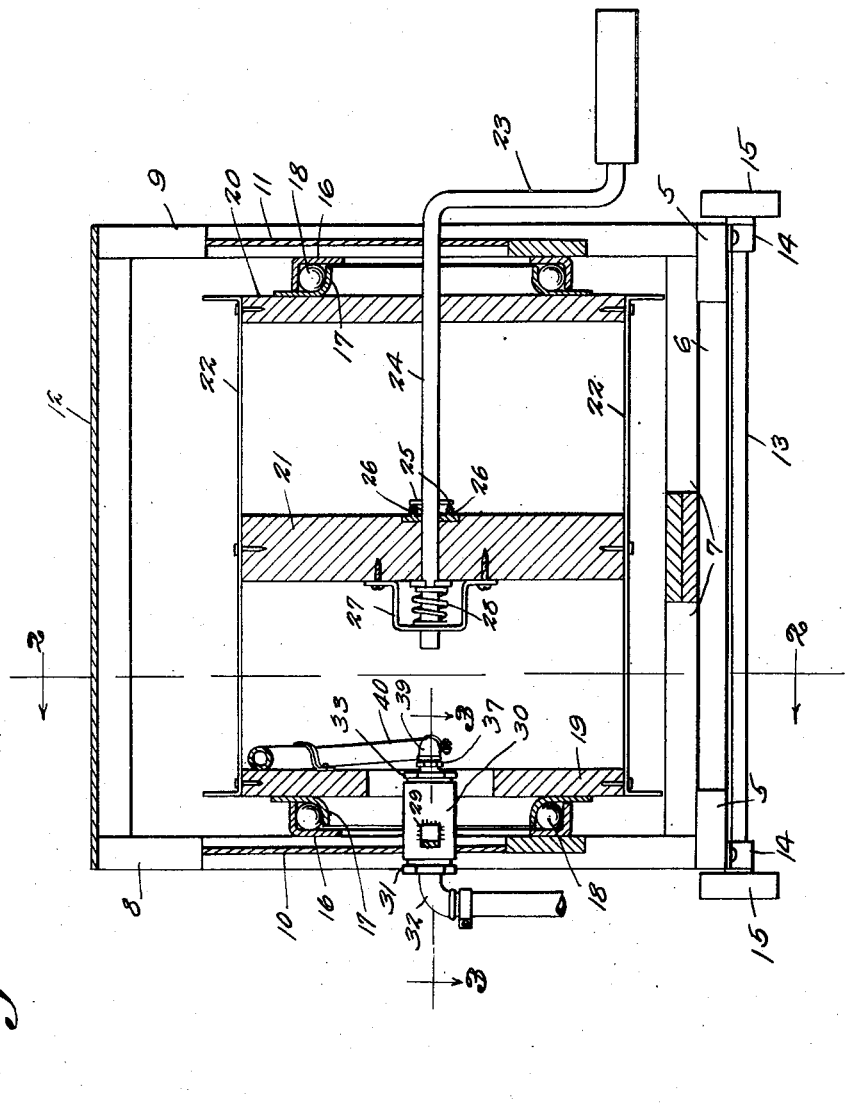
Fig. I.
D. A. Gross
Inventor April 3, 1951  D. A. GROSS  2,547,316
SWIVEL JOINT
Filed Dec. 16, 1946  2 Sheets-Sheet 2
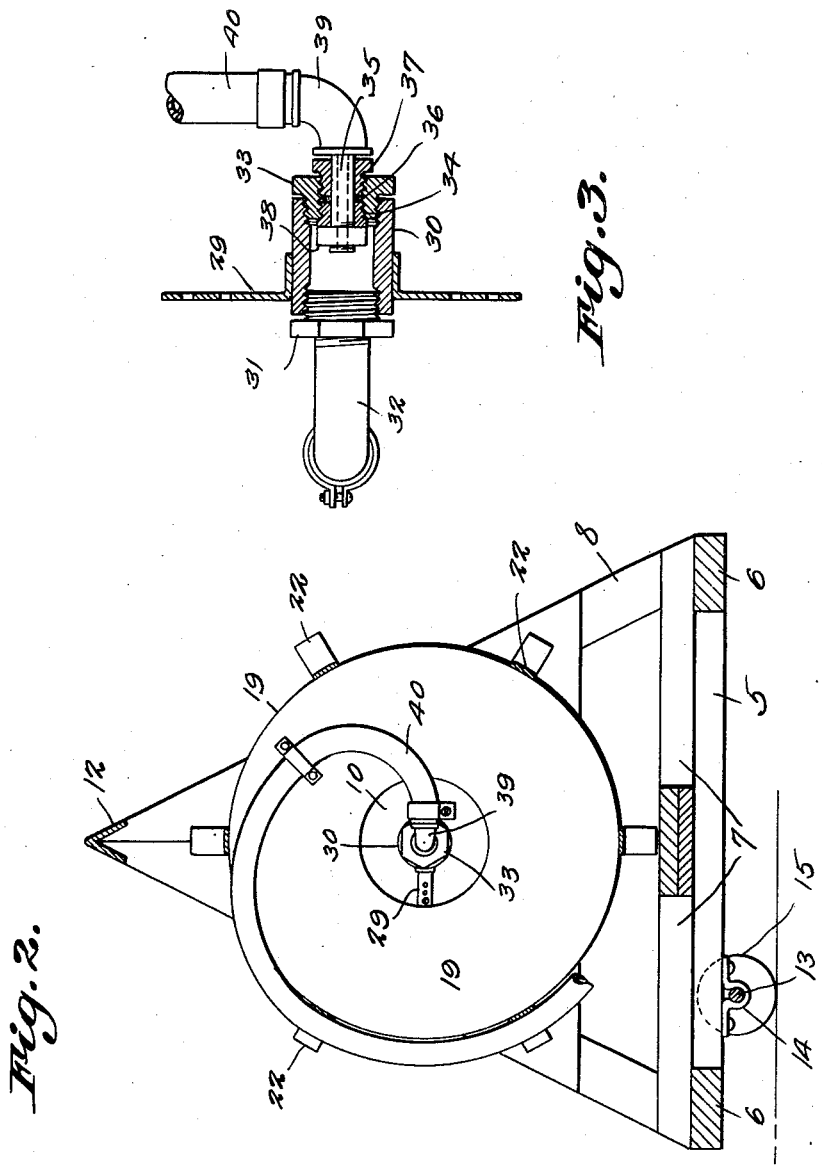
Inventor
D. A. Gross
By C. A. Snow & Co.
Attorneys Patented Apr. 3, 1951

2,547,316

UNITED STATES PATENT OFFICE 2,547,316

SWIVEL JOINT

Donald A. Gross, San Antonio, Tex.

Application December 16, 1946, Serial No. 716,660

1 Claim. (Cl. 285—97.5)

This invention relates to hose reels, and more particularly, hose reels which are designed for carrying a length of garden hose.

An important object of the invention is to provide a hose reel of the character described, in which there will be embodied new and unusually efficient features of construction, whereby the hose reel may be attached to a water supply fixture, permitting full use of the hose carried by reel while it is being unwound from or wound upon the hose spool embodied in the device.

It is a further object of the invention to provide a water supply unit as part of the device through which water may freely flow despite the necessity of one end of the unit being attached to a stationary water supply fixture, and the other end being revolvable with the hose spool on which the hose is carried.

It is a further important object of the invention to permit the water supply unit mentioned above to be capable of easy and simple detachment from the remainder of the device, the unit being designed with unusual simplicity and yet with durability and strength of high degree.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is a transverse vertical sectional view through a hose reel constructed in accordance with the invention, in which certain parts of the device are shown in elevation.

Figure 2 is a view taken substantially on line 2—2 of Figure 1.

Figure 3 is a view of a water supply unit embodied in the invention, taken substantially on line 3—3 of Figure 1.

Referring to the drawing in detail, the invention embodies a base comprising parallel spaced longitudinal base members 5, transverse parallel spaced base members 6, and diagonal cross members 7. Mounted on the base is a frame that has A members 8 and 9 mounted on the longitudinal base members 5, there being triangular plates 10 and 11 respectively, mounted on the members 8 and 9, closing the triangular openings therein. An upper connecting bar 12 completes the frame.

Attached to the axle 13 that rotates in bearings 14 secured to the undersides of the longitudinal base members 5 are wheels 15, whereby the hose reel may be moved to any desired location.

To the inner surfaces of the A members 8 and 9 are fixedly attached bearing cups 16 in which rotate the bearing cones 17 of the hose reel, providing a race for ball bearings 18 which may be of any suitable type.

Rotatable in the bearing cups 16 is the hose reel or spool comprising outer disc sections 19 and 20 and a center disc section 21, cconnected by a plurality of strips 22 which serve as bearings for a desired length of garden hose (not shown), the strips 22 being provided with upwardly-turned ends so as to preclude the possibility of the hose slipping from the spool.

For winding the hose on the spool there is provided a crank 23 having a crank shaft 24 that is extended through, and rotatable in, aligned openings in the plate 11, and disc sections 20 and 21.

Projecting from the crank shaft 24 are oppositely opposed pins 25 which are adapted to engage oppositely opposed teeth 26 mounted on the center disc section 21, and disposed adjacent to the opening in said section, in order that hose which has been unwound from the spool for use may be rewound thereon.

On the opposite face of the disc section 21, there is mounted over the opening a cage 27, having an opening through which the end of the crank shaft 24 projects, and encircling the portion of the crank shaft 24 within the cake 27 is a spring 28, which has its inner end connected to the crank shaft, making the crank shaft self-retracting when not being used, and causing disengagement of the pins 25 from the teeth 26, so that when hose is being unwound from the spool, the crank 23 will not revolve.

Fixedly secured within an opening in the plate 10, by means of strap-irons 29 is a pipe collar 30, into which is threaded at one end a reducer 31, which is connectable to a fitting 32 leading to a water supply (not shown) such as a conventional garden hydrant.

Into the other end of the pipe collar 30 is threaded a reducer 33, and into the inner end of the reducer 33 is threaded a nipple 34 which serves as a bearing for a rotatable hollow shaft 35, both ends of which are exteriorly threaded. Packing 36 encircles the shaft 35 adjacent the outer end of the nipple 34.

Threaded into the outer end of the reducer 33 is a reducer 37 in which the shaft 35 also rotatably bears. On the inner end of the shaft 35 there is then threaded a nut 38 which holds the shaft in its bearings, and on the outer projecting end of the shaft is threaded an L 39, to which the end of the hose 40 carried by the spool is connected.

From the above, it will be seen that by reason of the novel construction of my device, it is possible to use the hose as desired while unwinding it from the reel or spool. At the same time, the water issuing from the hose will be discharged in a steady stream, without spasmodic spurting, and without danger of the supply being cut off as the hose is unwound.

It is to be noted further that the construction of the device permits easy and simple removal of the unit thereof through which the water is supplied to the hose. In addition, this unit is maintained separate and apart from the portions of the device which serve as a bearing for the rotatable hose reel, thus freeing the unit from strain or wear which might otherwise result if it were to serve as a part of said bearing.

What is claimed is:

A coupling for joining two hose sections for relative rotation comprising an internally threaded sleeve adapted for non-rotatable connection to one hose section; a nipple threaded in one end of said sleeve, said nipple having a threaded bore; a pair of externally threaded bearing sleeves threaded into the bore of said nipple, said bearing sleeves having registering bearing openings; packing interposed between said bearing sleeves; a hollow shaft extending through and rotatable in the bearing openings; means holding the shaft against withdrawal from said openings; and a hose fitting rigid with said hollow shaft and connectable to the other hose section.

DONALD A. GROSS.

REFERENCES CITED

The following references are of record in the file of this patent:

UNITED STATES PATENTS

| Number | Name | Date |
| --- | --- | --- |
| 381,540 | Divekey | Apr. 24, 1888 |
| 976,774 | Bolner | Nov. 22, 1910 |
| 1,472,747 | Crocker | Oct. 30, 1923 |
| 1,608,538 | Wehmeier | Nov. 30, 1926 |